United States Patent
Yokozeki et al.

(10) Patent No.: US 11,221,035 B2
(45) Date of Patent: Jan. 11, 2022

(54) CONNECTING STRUCTURE FOR PLATE MEMBERS AND ASSEMBLY USING THE SAME

(71) Applicant: Azone Co., Ltd., Tokyo (JP)

(72) Inventors: Kenji Yokozeki, Tokyo (JP); Eriko Shimoda, Tokyo (JP)

(73) Assignee: AZONE CO., LTD., Tokyo (JP)

( * ) Notice: Subject to any disclaimer, the term of this patent is extended or adjusted under 35 U.S.C. 154(b) by 0 days.

(21) Appl. No.: 17/140,456

(22) Filed: Jan. 4, 2021

(65) Prior Publication Data

US 2021/0317857 A1  Oct. 14, 2021

(51) Int. Cl.
*F16B 12/12* (2006.01)
*F16B 5/00* (2006.01)
*A63H 33/06* (2006.01)

(52) U.S. Cl.
CPC ............ *F16B 12/12* (2013.01); *A63H 33/065* (2013.01); *F16B 5/0012* (2013.01)

(58) Field of Classification Search
CPC .......... F16B 12/12; F16B 5/0012; A63F 9/12; A63H 33/065; A63H 33/084
See application file for complete search history.

(56) References Cited

U.S. PATENT DOCUMENTS

| | | | | |
|---|---|---|---|---|
| 4,055,019 A | * | 10/1977 | Harvey | A63F 9/12 446/115 |
| 5,597,259 A | * | 1/1997 | Bogaerts | F16B 5/0012 403/263 |
| 7,654,055 B2 | * | 2/2010 | Ricker | A47B 47/0075 52/592.1 |
| 9,724,618 B2 | * | 8/2017 | Shalom | B32B 25/14 |
| 9,781,997 B2 | * | 10/2017 | Maertens | F16B 5/0016 |
| 10,933,305 B2 | * | 3/2021 | Udo | A63F 9/1208 |
| 2011/0197535 A1 | * | 8/2011 | Baker | E04F 15/02 52/588.1 |
| 2017/0058926 A1 | * | 3/2017 | Takubo | A47B 47/042 |
| 2018/0313377 A1 | | 11/2018 | Balint | |
| 2020/0215425 A1 | | 7/2020 | Udo et al. | |

FOREIGN PATENT DOCUMENTS

| | | | | |
|---|---|---|---|---|
| DE | 202011000200 U1 | * | 8/2011 | ........... A63H 33/065 |
| EP | 3 121 456 A1 | | 1/2017 | |
| FR | 2955630 A1 | * | 7/2011 | ........... F16B 5/0012 |
| FR | 3 012 342 A1 | | 5/2015 | |
| JP | 6440044 B | | 12/2018 | |
| KR | 10-1545708 B1 | | 8/2015 | |
| WO | WO-9715761 A1 | * | 5/1997 | ........... F16B 21/084 |
| WO | 2015/141439 A1 | | 9/2015 | |

* cited by examiner

*Primary Examiner* — Matthew R McMahon
(74) *Attorney, Agent, or Firm* — Norris McLaughlin, P.A.

(57) ABSTRACT

The present invention provides a connecting structure for plate members, including a projection projected from one of the plate members in a first direction, and a groove provided on the other of the plate members to have inner faces facing each other in a second direction intersecting the first direction and configured to fittingly receive the projection. The projection includes a main body, a resilient portion provided on one side of the main body in the second direction and resiliently inwardly deformable in the second direction, and an engagement portion outwardly expanded in the second direction from the resilient portion and configured to be plastically deformed along and engage with one of the inner faces of the groove when the groove fittingly receives the projection.

5 Claims, 5 Drawing Sheets

CONNECTING STRUCTURE FOR PLATE MEMBERS AND ASSEMBLY USING THE SAME

BACKGROUND OF THE INVENTION

1. Field of the Invention

The present invention relates to a connecting structure for plate members and an assembly using the same.

2. Description of the Related Art

There is an assembly such as a three-dimensional puzzle, model, and decoration which is formed by plate members connected together. The assembly being the three-dimensional puzzle or the like requires a connecting structure between the plate members, capable of easily assembling the plate members and keeping an assembled state thereof. As such a connecting structure, there is one disclosed in JP 6440044B.

The connecting structure is provided with projected connecting fragments provided on sides of each plate member and connecting grooves each between adjacent connecting fragments. The connecting fragments are projected from the sides in arc shapes and the connecting groove is defined between the adjacent connecting pieces so as to have a base end at which the width of the connecting groove is widest.

When the connecting the plate members, base ends of the connecting fragments on one of the plate members are fitted to the base ends of the connecting grooves on the other of the plate members, respectively. With this, the plate members are easily assembled together and kept the assembled state.

The connecting structure, however, needs to be bent when fitting the connecting fragments to the connecting grooves and there is limited on material applicable to the connecting structure.

SUMMARY OF THE INVENTION

An object of the present invention is to provide a connecting structure, capable of being applicable to a variety of materials for plate members while easily assembling the plate members and keeping the assembled state of the plate members.

In order to accomplish the object, an aspect of the present invention provides a connecting structure for plate members connected together. The connecting structure has a projection projected from one of the plate members in a first direction and a groove provided on the other of the plate members to have inner faces facing each other in a second direction and configured to fittingly receive the projection, the second direction intersecting the first direction. The projection has a main body being a portion projected from said one of the plate members in the first direction, a resilient portion provided on one side of the main body in the second direction and resiliently inwardly deformable in the second direction, and an engagement portion outwardly expanded in the second direction from the resilient portion and configured to be plastically deformed along and engage with one of the inner faces of the groove when the groove fittingly receives the projection.

According to the aspect, the connecting structure is applicable to a variety of materials of plate members while easily assembling the plate members and keeping the assembled state of the plate members.

DETAILED DESCRIPTION OF EMBODIMENTS

Figure 1:
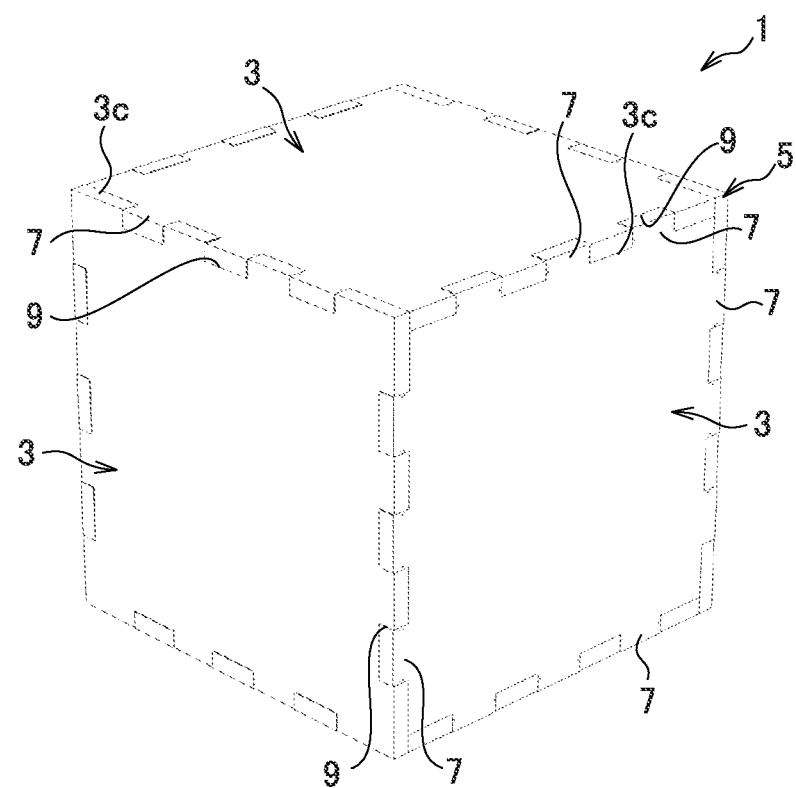
FIG. 1 is a perspective view illustrating an assembly to which a connecting structure for plate members according to a first embodiment of the present invention is applied.

The embodiments according to the present invention improve a projection and a groove fittingly receiving the projection, to apply a connecting structure to a variety of materials of plate members while easily assembling the plate members and keeping the assembled state of the plate members.

Namely, the projection is projected from one of the plate members in a first direction, and the groove is provided on the other of the plate members to have inner faces in a second direction intersecting the first direction and are configured to fittingly receive the projection. The projections includes a main body being a portion projected from said one of the plate members in the first direction, a resilient portion provided on one side of the main body in the second direction and resiliently inwardly deformable in the second direction, and an engagement portion outwardly expanded in the second direction from the resilient portion and configured to be plastically deformed along and engage with one of the inner faces of the groove when the groove fittingly receive the projection.

The engagement portion may be gradually outwardly expanded in the second direction toward a base end of the main body.

The material of the engagement portion may be the same as or different from the material of the resilient portion. In the case that the material of the engagement portion is the same as the material of the resilient portion, the engagement portion may set a dimension of the projection in the second direction greater than a dimension of the groove in the second direction in a free state in which the projection is not fittingly received in the groove. In this case, a difference between the dimensions of the projection and the groove based on the engagement portion in the second direction may be greater than an amount of resilient deformation of the resilient portion in the second direction. Further, the resilient portion may be made of material more resiliently deformable than the resilient portion.

The resilient portion may be provided on each side of the main body in the second direction and the engagement portion may be provided on the resilient portion on said each side of the main body. The engagement portion may be, however, formed on only one of the resilient portions on respective sides of the main body.

The resilient portion may be a cantilever, in which one end in the first direction is integrated with the main body and the other end in the first direction is displaced relative to said one end toward the base end of the main body, to define a gap between the resilient portion and the main body in the second direction, the gap within which the resilient portion is resiliently deformable in the second direction. Further, the resilient portion may be integrated with the main body at both ends in the first direction while forming the gap between the resilient portion and the main body.

The inner faces of the groove in the second direction may be parallel with each other.

An assembly employing the connecting structure has the plate members connected together using the connecting structure.

Hereinafter, the embodiments of the present invention will be explained in detail with reference to drawings.

FIG. 1 is a perspective view illustrating an assembly to which a connecting structure for plate members according to the first embodiment of the present invention is applied.

As illustrated in FIG. 1, the assembly 1 is a three-dimensional puzzle, model, decoration or the like and is formed by plate members 3 being connected together. As the three-dimensional puzzle, model, decoration or the like, the assembly 1 may have a variety of shapes or figures such as animals, buildings, and vehicles. The assembly 1 in the present embodiment, however, has a cube shape for understandability.

The plate members 3 for the assembly 1 are flat plates made of wood, bamboo, paper or the like. The plate members 3 are cut out from a plate-like base material (not illustrated) by laser cutting. The material of the plate members 3 may be resin, metal or the like. The formation of the plate members 3 may be performed by press-forming, injection-forming or the like. In this way, a variety of materials and formation methods may be employed for the plate materials 3. In order to connect the plate materials 3, a connecting structure 5 is used.

Figure 2:
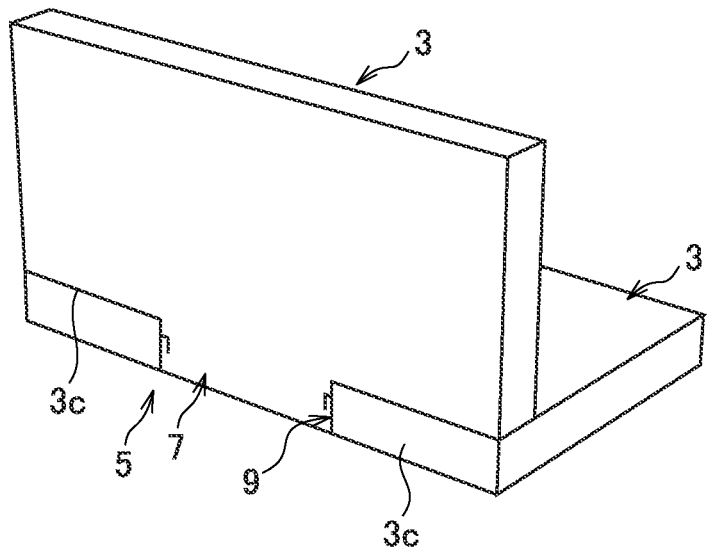
FIG. 2 is a perspective view partly illustrating the connecting structure for the plate members used in the assembly of FIG. 1.
Figure 3:
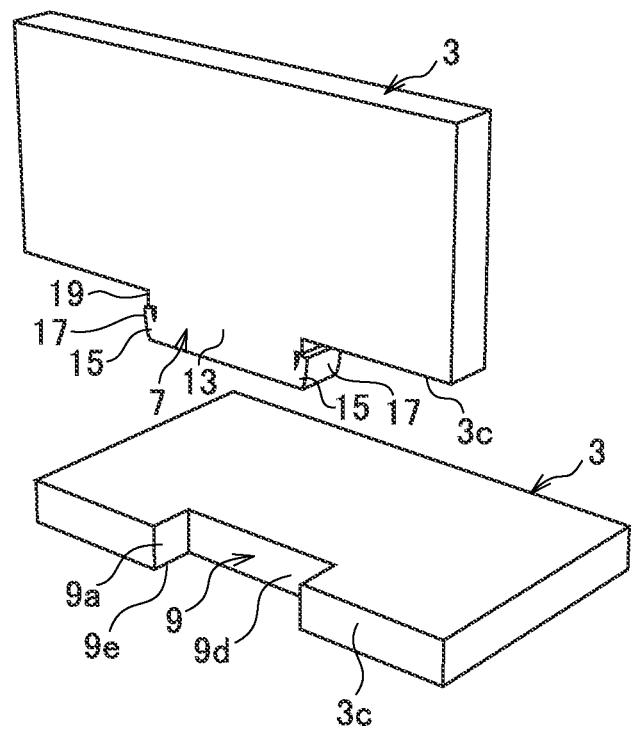
FIG. 3 is an exploded perspective view of the connecting structure of FIG. 2.
Figure 4A:
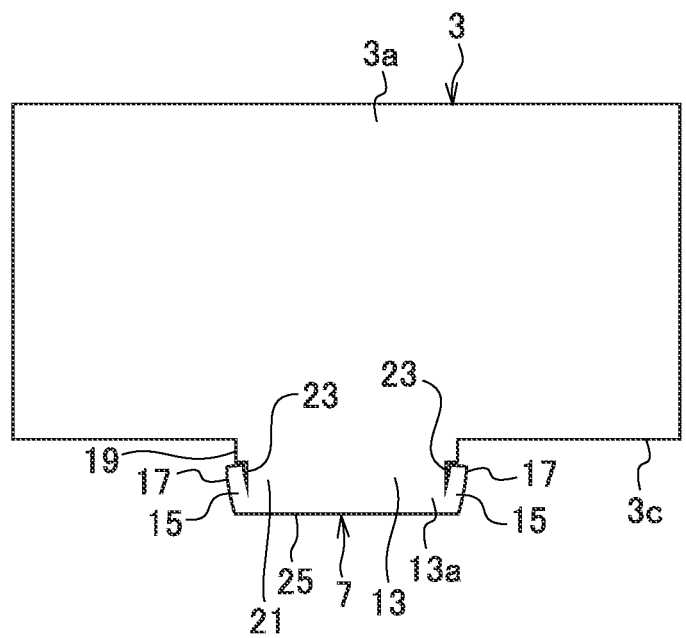
FIG. 4A is a plan view partly illustrating one of the plate members used in the connecting structure of FIG. 2.
Figure 4B:
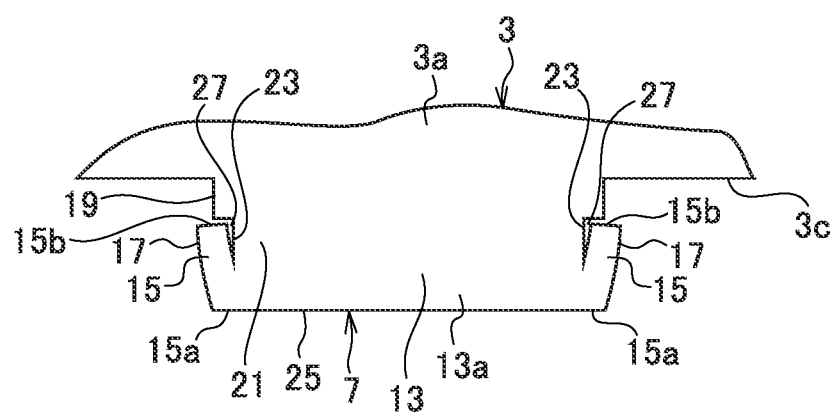
FIG. 4B is an enlarged plan view of part of FIG. 4A.
Figure 5:
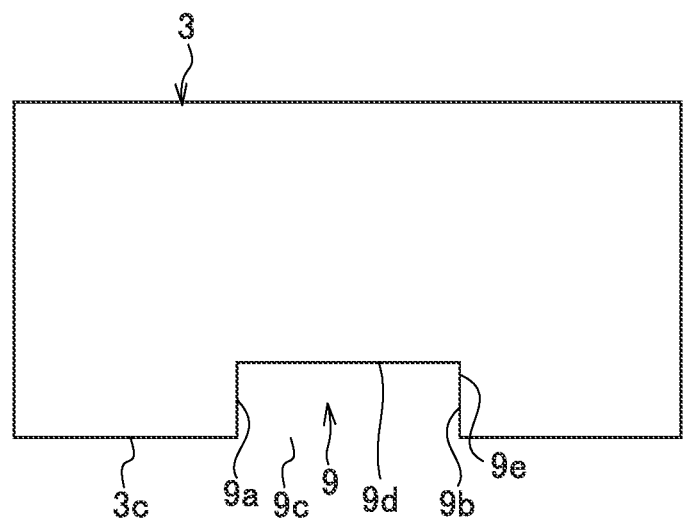
FIG. 5 is a plan view partly illustrating the other of the plate members used in the connecting structure of FIG. 2.

FIG. 2 is a perspective view partly illustrating the connecting structure 5 for the plate members 3 used in the assembly of FIG. 1, FIG. 3 is an exploded perspective view of the connecting structure 5 of FIG. 2, FIGS. 4A and 4B are plan views partly illustrating one of the plate members 3 used in the connecting structure 5 of FIG. 2, and FIG. 5 is a plan view partly illustrating the other of the plate members 3 used in the connecting structure 5 of FIG. 2.

The connecting structure 5 comprises a projection 7 and a groove 9.

The projection 7 is projected from one of the plate members 3 connected together. The projecting direction or the longitudinal direction of the projections 7 is a first direction along which the projections 7 are projected. According to the embodiment, a plurality of projections 7 are arranged along each of edges 3c of the plate material 3 at regular intervals. The number of the projections 7 is optional.

The projections 7 of the present embodiment are formed at the time of cutting the plate member 3 out from the base material. With this, the projections 7 are projected from the edges 3 of the plate member 3 along a planar direction. The planar direction is a direction along a plane of the assembly 1 formed by the plate member 3 to which the projections 7 are projected. The projections 7 may be, however, formed separately from the plate member 3 and be fixedly attached to the plate member 3. The projecting amount of the projections 7 is the same as a thickness of the plate member 3.

Each projection 7 is provided with a main body 13, resilient portions 15, and engagement portions 17.

The main body 13 is a portion of the projection 7 projected from one of the plate members 3 in the projecting direction or the longitudinal direction as the first direction. According to the embodiment, the main body 13 is formed into a column shape projected from the edges 3c of the plate member 3 in the planar direction.

The main body 13 has a base end 19, an intermediate portion 21 and a front end 25 in the projecting direction. The width of the intermediate portion 21 is smaller than the width of the base end 19 in a width direction as a second direction intersecting the projecting direction.

With this, the main body 13 has a stepped planar shape with a step 23 recessed in the width direction. The planar shape of the main body 13 is not particularly limited to the stepped shape.

The base end 19 of the main body 13 is a portion adjoining to the plate member 3 and occupying a given range in the projecting direction. The intermediate portion 21 is a portion adjoining to the base end 19 on an opposite side relative to the plate member 3 and occupying a given range in the projecting direction.

The surface 13a of the main body 13 is flush with the surface 3a of the plate member 3. The surface 13a of the main body 13 may be stepped, particularly projected or recessed, relatively to the surface 3a of the plate member 3. On the main body 13, the resilient portions 15 are provided.

The resilient portions 15 of the present embodiment are provided on the respective sides of the main body 13 in the width direction and are configured to be resiliently inwardly deformable in the width direction. The resilient portion 15 may be, however, provided on at least one side of the main body 13 in the width direction. Each resilient portion 15 is a cantilever having one end 15a and the other end 15b in the projecting direction of the projection 7. The one end 15a is integrated with the main body 13 and the other end 15b is displaced relative to the one end 15a toward the base end 19 of the main body 13.

According to the present embodiment, the one end 15a of the resilient portion 15 is integrated with the front end 25 of the main body 13. With this, the dimension of the front end 25 of the main body 13 is the same as the dimension of the base end 19 of the main body 13 in the width direction. In addition, the one end 15a of the resilient portion 15 may be integrated with a portion closer to the intermediate portion 21 relative to the front end 25 of the main body 13.

The resilient portion 15 of the present embodiment is gradually outwardly expanded in the width direction toward the base end 19 of the main body 13. In particular, the resilient portion 15 is inclined as a whole so as to be gradually outwardly expanded in the width direction toward the base end 19 of the main body 13. With the inclination, the resilient portion 15 inwardly define a gap 27 between the resilient portion 15 and the main body 13 in the width direction. Within the gap 27, the resilient portion 15 is resiliently deformable in the width direction. On the resilient portions 15, the engagement portions 17 are provided.

The engagement portions 17 are outwardly expanded from the respective resilient portions 19 on both sides of the main body 13 in the width direction. The engagement portions 17 are plastically deformed along and engage with the respective inner faces 9a and 9b of a corresponding one of the grooves 9 in the width direction when the groove 9 fittingly receives the projection 7.

According to the embodiment, each of the engagement portions 17 is formed by a part of the resilient portion 15. Namely, the material of the engagement portion 17 is the same as the material of the resilient portion 15. Further, the engagement portion 17 is gradually outwardly expanded in the width direction toward the base end 19 of the main body 13 according to the resilient portion 15.

The engagement portion 17 sets the dimension of the projection 7 greater than the dimension of the groove 9 in the width direction in a free state in which the projection 7 is not fittingly received or fitted into the groove 9. The dimension of the groove 9 is the same as or slightly greater than the dimension of the front end 25 and the base end 19 of the main body 13 in the width direction. Further, the expanding amount of the resilient portion 15 is greater than the dimension of the gap 27 in the width direction.

Namely, the difference between the dimensions of the projection 7 and the groove 9 based on the engagement portion 17 is greater than the amount of resilient deformation of the resilient portion 15 in the width direction. Accordingly, the amount of plastic deformation of the engagement portion 17 is set by the size of the gap 27 and the expanding amount of the engagement portion 17.

The groove 9 is provided on the other of the plate members 3 connected together to have inner faces 9a and 9b facing each other in the width direction and are configured to fittingly receive the projection 9. According to the embodiment, a plurality of grooves 9 are arranged on the edges 3c of the plate member 3 so as to correspond to the respective projections 7. The number of the grooves 9 is appropriately set according to the number of the projections 7. The positions of the grooves 9 are not limited to the edges 3c of the plate member 3. For example, the grooves 9 may be formed on a central portion or the like of the plate member 3. In this case, the grooves 9 may be holes passing through the plate member 3 in the thickness direction.

Each groove 9 is formed at the time of cutting the plate member 3 out from the base material. The groove 9 is recced in the planar direction. Further, the groove 9 is open on the both surfaces 3a of the plate member 3 in the thickness direction. Namely, the groove 9 is configured to fittingly receive the projection 7 selectively in the planar direction or the thickness direction.

The depth of the groove 9 in the plan view is the same as the thickness of the plate member 3 according to the projection 7. With this, the projection 7 is fittingly received within the groove 9 in the planar or the thickness direction.

The inner faces 9a and 9b in the width direction of the groove 9 are along the depth direction of the recessed planar shape of the groove 9 and parallel with each other. Namely, the groove 9 has the constant dimension in the width direction from an opening 9c to a bottom 9d in the recessed planar shape. The inner faces 9a and 9b of the groove 9 may not be parallel with each other. For example, the inner faces 9a and 9b may be inclined so as to gradually widen the groove 9 toward the opening 9c.

Figure 6:
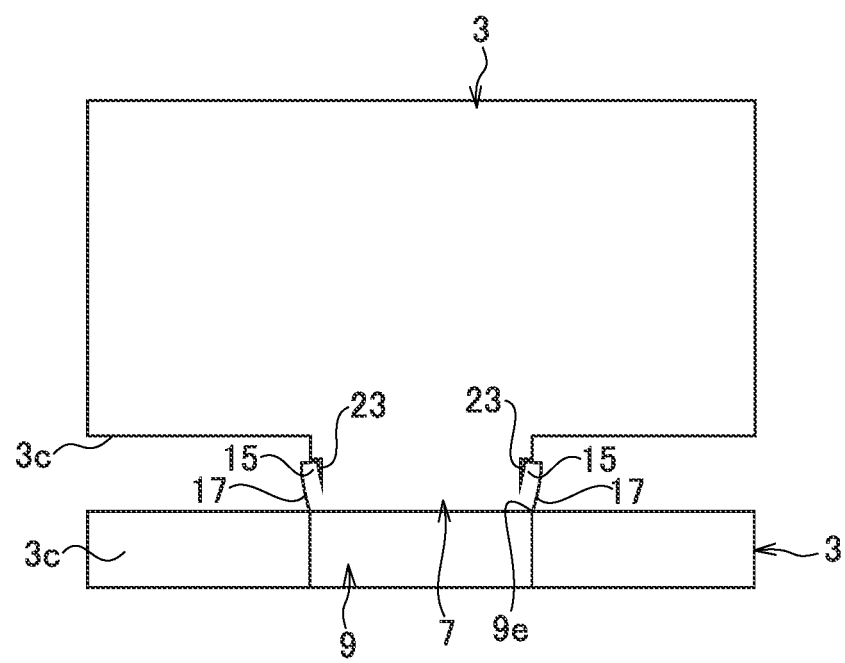
FIG. 6 is a front view illustrating a state just before a projection is fitted to a groove of the connecting structure of FIG. 2.

FIG. 6 is a front view illustrating a state just before the projection 7 is fitted to the groove 9 of the connecting structure 5 of FIG. 2.

The assembly 1 of the present embodiment is assembled by connecting the plate members 3 with the connecting structure 5 without tools, adhesive or the like. Namely, the connection based on the connecting structure 5 is performed by fitting the projections 7 of one of the plate members 3 into the grooves 9 of the other of the plate members 3.

In order to fit the projection 7 into the groove 9, the front end 25 of the main body 13 of the projection 7 is pressed to the groove 9 in the thickness direction first. In this state, the projection 7 is advanced into the groove 9. The advance of the projection 7 into the groove 9 may be performed in the planar direction instead of the thickness direction.

At this time, although the engagement portion 17 sets the projection 7 greater than the groove 9 in the width direction, the projection 7 is smoothly advanced into the groove 9 according to the gradually expanding shape of the engagement portion 17.

Further, the edge 9e of the groove 9 presses the engagement portion 17 inwardly in the width direction during the advance. With the pressing, the engagement portion 17 is plastically deformed on the one end 15a of the resilient portion 15.

On the other end 15b of the resilient portion 15, the resilient portion 15 is resiliently inwardly deformed in the width direction so as to enter into the step 23 due to the gap 27. Then, the gap 27 is disappeared by the resilient deformation of the resilient portion 15 and the engagement portion 17 on the other end 15b is plastically deformed.

At this time, since the engagement portion 17 is brought into line contact with the edge 9e, the contact area between the engagement portion 17 and the edge 9e is relatively small. With this, the edge 9e smoothly presses the engagement portion 17 to plastically deform the engagement portion 17. As a result, the projection 7 is smoothly and easily advanced into the groove 9.

According to the embodiment, the resilient portion 15 and the engagement portion 17 are provided on each side of the projection 7 in the width direction, so that resistance equivalently acts on each side of the projection 7 in the width direction when fitting the projection 7 into the groove 9. The projection 7 is, therefore, advanced into the groove 9 easily and stably.

The plastic deformation of the engagement portion 17 is performed by compressive deformation of the engagement portion 17 in the width direction. According to the compressive deformation, the inner faces 9a and 9b of the groove 9 are brought into surface contact with the engagement portions 17 and the contact areas between the engagement portions 17 and the inner surfaces 9a and 9b are gradually enlarged. This increases engagement force of the engagement portions 17 of the projections 7 to the inner faces 9a and 9b of the groove 9.

In a fitted state in which the projection 7 is completely advanced into the groove 9, the inner faces 9a and 9b of the groove 9 engage with the engagement portions 17 with the increased contact areas. The engagement is kept even if force relatively acts on the projection 7 or the groove 9 in a pulling direction of the projection 7.

Namely, if the force relatively acts on the projection 7 in the pulling direction, the resilient portion 15 is urged to outwardly open in the width direction according to restoring force of the resilient portion 15 and frictional force between the inner faces 9a and 9b and the engagement portions 17. As this result, the engagement portions 17 more firmly engage with the inner faces 9a and 9b of the groove 9 and the projection 17 is prevented from being pulled out from the groove 9.

In this state, force evenly acts on each side of the projection 7 in the width direction to keep the fitting state between the projection 7 and the groove 9 according to the structure in which the resilient portion 15 and the engagement portion 17 are formed on each side of the projection 7.

As mentioned above, the connecting structure 5 of the present embodiment has the projection 7 projected from one of the plate members 3 connected together, and the groove 9 provided on the other of the plate members 3 to have inner faces 9a and 9b in the width direction and configured to fittingly receive the projection 7.

In the fitting state between the projection 7 and the groove 9, the projection 7 is located inside the groove 9.

Then, the projection 7 has the main body 13 being the portion projected from one of the plate members 3 in the projecting direction of the projections 7, the resilient portion 15 provided on one side of the main body 13 in the width direction intersecting the projecting direction and resiliently inwardly deformable in the width direction, and the engagement portion 17 outwardly expanded in the width direction from the resilient portion 15 and configured to be plastically deformed along and engage with one of the inner faces 9a and 9b of the groove 9 in the width direction when the groove 9 fittingly receive the projection 7.

The projection 7 is, therefore, easily fittingly received or fitted to the groove 9 from a state of the engagement portions 17 before plastically deformed. Further, the engagement portions 17 of the projection 7 are plastically deformed along and engage with the inner faces 9a and 9b, so that the fitting state between the projection 7 and the groove 9 is kept with the increased engagement force. Furthermore, the resilient portions 15 are urged to open in the width direction to firmly engage the engagement portions 17 with the inner faces 9a and 9b even if the force relatively acts on the projection 7 in the pulling direction. This prevents the projection 7 from being pulled out from the groove 9.

As a result, the connecting structure 5 for the plate materials 3 of the present embodiment enables the plate materials 3 to be easily assembled and keeps the assembled state of the plate materials 3. Further, the connecting structure 5 is applied to a variety of materials for the plate members 3 regardless of bendability as long as the resilient portion 15 is resiliently deformed and the engagement portion 17 is plastically deformed.

Further, the engagement portion 17 is gradually outwardly expanded in the width direction toward the base end 19 of the main body 13. With this, the projection 7 is more easily fitted to the groove 9.

The engagement portion 17 is made of the same material as the resilient portion 15 and sets the dimension of the projection 7 greater than the dimension of the groove 9 in the width direction in the free state in which the projection 7 is not fittingly received or fitted in the groove 9. The difference between the dimensions of the projection 7 and the groove 9 based on the engagement portion 17 is greater than the amount of the resilient deformation of the resilient portion 15 in the width direction.

It is, therefore, easily realized that the engagement portion 17 is made of the same material as the resilient portion 15.

The resilient portion 15 is provided on each side of the main body 13 in the width direction and the engagement portion 17 is provided on the resilient portion 15 on each side.

The resistance when fitting the projection 7 into the groove 9 and the force to keep the fitting state between the projection 7 and the groove 9, therefore, evenly act on each side of the projection 7 in the width direction. This enables the plate materials 3 to be more easily and stably assembled and keeps the assembled state of the plate materials 3.

The resilient portion 15 is the cantilever, in which the one end 15a in the projecting direction is integrated with the main body 13 and the other end 15b in the projecting direction is displaced relative to the one end 15a toward the base end 19 of the main body 13, to define the gap 27 between the resilient portion 15 and the main body 13 in the width direction, the gap 27 within which the resilient portion 15 is resiliently deformable in the width direction.

The present embodiment, therefore, easily sets the amount of the plastic deformation of the engagement portion 17, the facility of the fitting and the performance to keep the fitting based on the amount of the plastic deformation according to the size of the gap 27 and the projecting amount of the engagement portion 17.

Further, the inner faces 9a and 9b of the groove 9 facing in the width direction are parallel with each other, so that the projection 7 is easily inserted into and fitted to the groove 9 in the projecting direction.

Further, the assembly 1 of the present embodiment has the plate members 3 connected together using the connecting structure 5. The assembly 1 is, therefore, surely kept the assembled state while formed of a variety of materials.

Figure 7:
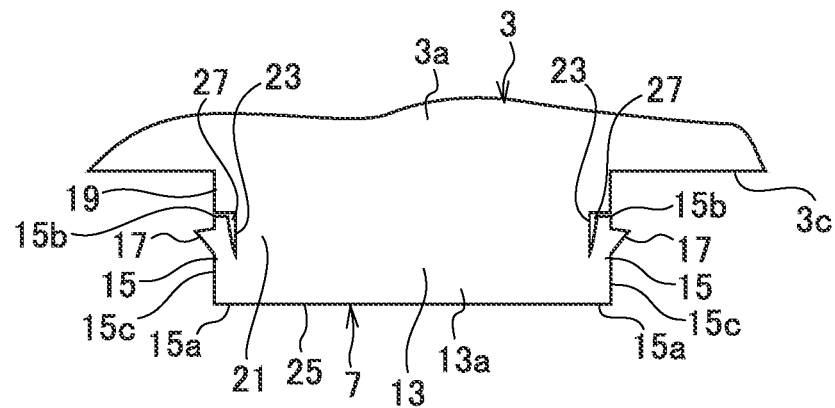
FIG. 7 is an enlarged plan view partly illustrating one of plate members used in a connecting structure according to a second embodiment of the present invention.

FIG. 7 is an enlarged plan view partly illustrating one of plate members used in a connecting structure according to the second embodiment of the present invention. In the second embodiment, the basic structure corresponds to that of the first embodiment, and corresponding parts or components are represented with the same reference numerals as the first embodiment to eliminate duplicate explanation.

The connecting structure 5 of the present embodiment has a different shape of the engagement portion 17 of the projection 7 from the first embodiment.

Namely, the resilient part 15 of the projection 7 has an outer face 15c in the width direction being flat along the projecting direction. From the outer face 15c of the resilient portion 15, the engagement portion 17 is projected. The engagement portion 17 of the present embodiment has a triangular planar shape. The engagement portion 17 may have however, a different planar shape such as a sector shape. The number of the engagement portion 17 may be altered.

The present embodiment provides the same effect as the first embodiment.

Figure 8:
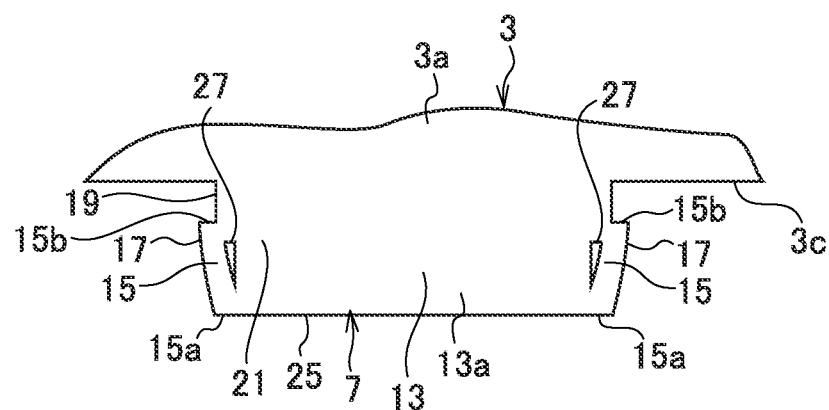
FIG. 8 is an enlarged plan view partly illustrating one of plate members used in a connecting structure according to a third embodiment of the present invention.

FIG. 8 is an enlarged plan view partly illustrating one of plate members used in a connecting structure according to the third embodiment of the present invention. In the third embodiment, the basic structure corresponds to that of the first embodiment, and corresponding parts or components are represented with the same reference numerals as the first embodiment to eliminate duplicate explanation.

The connecting structure 5 of the present embodiment has the double-supported resilient portion 15 of the projection 7. Namely, the other end 15b of the resilient portion 15 is also integrated with the main body 13.

The present embodiment provides the same effect as the first embodiment.

Figure 9:
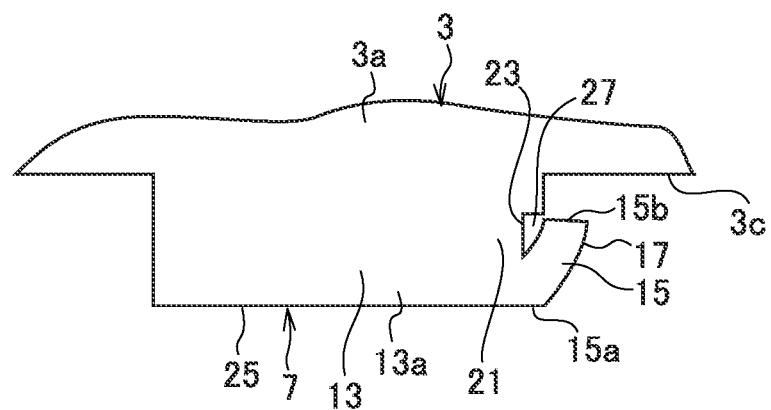
FIG. 9 is an enlarged plan view partly illustrating one of plate members used in a connecting structure according to a fourth embodiment of the present invention.

FIG. 9 is an enlarged plan view partly illustrating one of plate members used in a connecting structure according to the fourth embodiment of the present invention. In the fourth embodiment, the basic structure corresponds to that of the first embodiment, and corresponding parts or components are represented with the same reference numerals as the first embodiment to eliminate duplicate explanation.

The connecting structure 5 of the present embodiment has the resilient portion 15 of the projection 7 only on one side of the main body 13 in the width direction. Accordingly, the resilient portion 15 of the present embodiment has the gap 27 and the projecting amount of the engagement portion 17 larger than of the first embodiment.

The present embodiment provides the similar effect to the first embodiment.

What is claimed is:

1. A connecting structure for plate members connected together, comprising:
    a projection projected from one of the plate members in a first direction;
    a groove provided on the other of the plate members to have inner faces facing each other in a second direction and configured to fittingly receive the projection, the second direction intersecting the first direction, wherein the projection comprises:
        a main body being a portion projected from said one of the plate members in the first direction;
        a resilient portion provided on one side of the main body in the second direction and resiliently inwardly deformable in the second direction; and
        an engagement portion outwardly expanded in the second direction from the resilient portion and configured to be plastically deformed along and engage with one of the inner faces of the groove when the groove fittingly receives the projection,
    wherein the resilient portion is a cantilever, in which one end in the first direction is integrated with the main body and the other end in the first direction is displaced relative to said one end toward a base end of the main body, to define a gap between the resilient portion and the main body in the second direction, the gap within which the resilient portion is resiliently deformable in the second direction, and
    wherein the engagement portion is made of a same material as the resilient portion and sets a dimension of the projection in the second direction greater than a dimension of the groove in the second direction in a free state in which the projection is not fittingly received in the groove, and
    a difference between the dimensions of the projection and the groove based on the engagement portion in the second direction is greater than an amount of resilient deformation of the resilient portion in the second direction.

2. The connecting structure according to claim 1, wherein the engagement portion is gradually outwardly expanded in the second direction toward the base end of the main body.

3. The connecting structure according to claim 1, wherein the resilient portion is provided on each side of the main body in the second direction, and the engagement portion is provided on the resilient portion on said each side of the main body.

4. The connecting structure according to claim 1, wherein the inner faces of the groove in the second direction are parallel with each other.

5. An assembly using the connecting structure according to claim 1, comprising:
    plate members connected together using the connecting structure.

\* \* \* \* \*